United States Patent [19]
Wong

[11] Patent Number: 5,917,739
[45] Date of Patent: *Jun. 29, 1999

[54] CALCULATING THE AVERAGE OF FOUR INTEGER NUMBERS ROUNDED TOWARDS ZERO IN A SINGLE INSTRUCTION CYCLE

[75] Inventor: Roney S. Wong, Sunnyvale, Calif.

[73] Assignee: Samsung Electronics Co., Ltd., Rep. of Korea

[*] Notice: This patent is subject to a terminal disclaimer.

[21] Appl. No.: 08/748,873

[22] Filed: Nov. 14, 1996

[51] Int. Cl.$^6$ .................................................. G06F 7/38
[52] U.S. Cl. ............................................................ 364/734
[58] Field of Search .............................. 364/715.01, 723, 364/724.16, 736, 715.08, 734, 784, 786, 787, 745.01–745.04

[56] References Cited

U.S. PATENT DOCUMENTS

| | | | |
|---|---|---|---|
| 3,789,203 | 1/1974 | Catherall et al. | 235/152 |
| 4,031,370 | 6/1977 | Catherall | 235/152 |
| 4,040,052 | 8/1977 | Stanislaw | 342/197 |
| 4,218,751 | 8/1980 | McManigal | 364/784 |
| 4,334,237 | 6/1982 | Reitmeier et al. | 348/619 |
| 4,368,433 | 1/1983 | Imazeki et al. | 327/126 |
| 5,260,975 | 11/1993 | Saito | 375/327 |
| 5,373,459 | 12/1994 | Taniguchi | 364/715.01 |
| 5,428,567 | 6/1995 | Horvath et al. | 365/78 |
| 5,481,553 | 1/1996 | Suzuki et al. | 371/49.1 |
| 5,710,732 | 1/1998 | Wong | 364/734 |

*Primary Examiner*—Chuong Dinh Ngo
*Attorney, Agent, or Firm*—Skjerven, Morrill, MacPherson, Franklin & Friel, LLP; David M. Sigmond

[57] ABSTRACT

The n-bit average of four signed or unsigned n-bit integer operands (A, B, C and D) rounded towards zero as prescribed in the MPEG standard is calculated in one instruction cycle by appending two bits to a left side of each of the operands to provide four n+2 bit extended operands, summing the extended operands to provide an n+2 bit sum, removing the two least significant bits of the n+2 bit sum to provide an n-bit sum, and incrementing the n-bit sum as appropriate. An append circuit (302) appends two bits to the left sides of the operands, and the extended operands are coupled to an adder circuit (306) that includes adder logic (308) and an n-bit carry lookahead adder (310). The adder logic (308) provides the two least significant bits of the sum of the extended operands, along with n partial sum bits and n partial carry bits to the adder (310). The adder (310) provides a sum output, representing the n most significant bits of the sum of the extended operands, and a sum-plus-one output representing the sum output incremented by one. A multiplexer (314) under control of a control circuit (312) selects one of the sum and sum-plus-one outputs as the n-bit average based on inspection of the two least significant bits and the most significant bit of the sum of the extended operands, and a mode signal indicative of whether the operands are signed or unsigned values.

29 Claims, 7 Drawing Sheets

CALCULATING THE AVERAGE OF FOUR INTEGER NUMBERS ROUNDED TOWARDS ZERO IN A SINGLE INSTRUCTION CYCLE

BACKGROUND OF THE INVENTION

1. Field of the Invention

The present invention relates to calculating the average of four integer numbers, and more particularly to single instruction cycle calculation of the average of four signed or unsigned integer numbers with a correctly rounded result and without errors due to overflow of intermediate results.

2. Description of Related Art

The Moving Picture Experts Group (MPEG) standard has emerged as the dominant standard for compressed digital video. The MPEG-1 standard specifies a compressed video bit-stream rate of approximately 1.5 megabits per second, and a compressed stereo audio bit-stream rate of approximately 250 kilobits per second. The second standard, MPEG-2, will specify compression rates for higher-bandwidth distribution media, and is in the process of being formalized. To meet the MPEG standard, video and audio compression and decompression products must rapidly process the various algorithms used to implement the MPEG standard.

Figure 1:
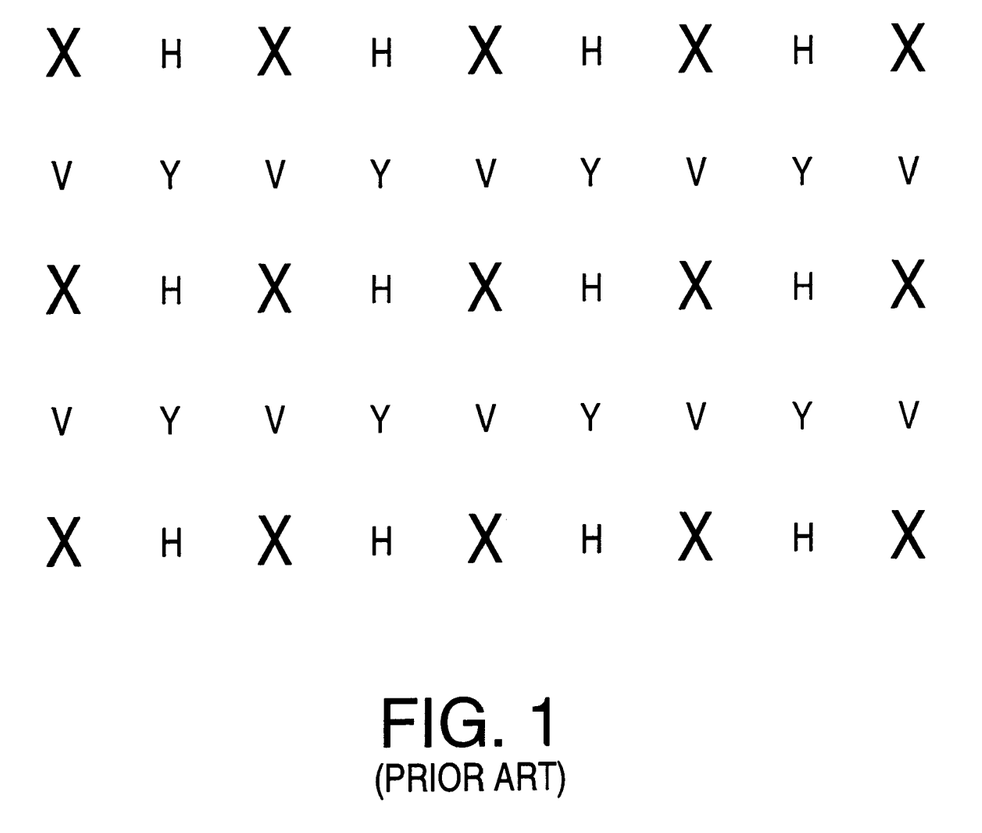
FIG. 1 is an illustrative block of pixels showing half pixel interpolations as specified by the MPEG standard.

The MPEG standards impose the need for bi-directional temporal differential pulse code modulation (DPCM) and half pixel motion estimation. FIG. 1 shows an illustrative block of pixels X. In practice, a block contains more pixels than shown in FIG. 1, which is abbreviated for clarity. For example, typically in video signal processing, the basic video information processing unit is a macro-block, which has a 16×16 pixel matrix comprising four 8×8 luminance blocks, and two 8×8 chrominance blocks. Each macro-block is part of a much larger luminance or chrominance frame, as the case may be. In FIG. 1, the pixel X represents either luminance or chrominance, with the output corresponding to an unsigned integer number.

MPEG motion processing involves half pixel motion estimation as well as full pixel motion estimation. In FIG. 1, the "H" points represent horizontal interpolations, the "V" points represent vertical interpolations, and the "Y" points represent both horizontal and vertical interpolations. The interpolations "H" and "V" are calculated in accordance with the expression $$(X_1+X_2)/2 \qquad (1)$$

wherein $X_1$ and $X_2$ are horizontally contiguous pixels for the interpolation "H" and are vertically contiguous pixels for the interpolation "V." The interpolations "Y" are calculated in accordance with the expression $$(X_1+X_2+X_3+X_4)/4 \qquad (2)$$

wherein $X_1$ and $X_3$ and $X_2$ and $X_4$ are diagonally contiguous pixels. In expressions (1) and (2), the symbol "/" as specified by the MPEG standard represents integer division with rounding towards zero. In round towards zero, all non-integers are rounded to the next smallest integer. That is, the integer component is left intact and the fractional component is truncated. For instance, 7/4 and −7/−4 are rounded to 1, and −7/4 and 7/−4 are rounded to −1.

Expression (2) has been implemented by right-shifting $X_1$, $X_2$, $X_3$ and $X_4$ by two bits, summing the right-shifted operands to provide a result, obtaining a separate sum of the shifted-out bits, then rounding the result based on inspection of the sum of the shifted-out bits. While this is a simple operation, in some cases the result may need to increase by two or three for proper rounding in accordance with the MPEG standard. However, in a general purpose computer, if increment is the available operation in a single instruction cycle then several instruction cycles may be needed to perform several consecutive increments.

Another known implementation of expression (2) includes summing $X_1$ and $X_2$ to provide a first intermediate result, summing $X_3$ and $X_4$ to provide a second intermediate result, adding the first and second intermediate results to provide a third intermediate result, inspecting the two least significant bits of the third intermediate result, right-shifting the third intermediate result by two bits, and rounding the shifted result based on inspection of the two pre-shifted least significant bits of the third intermediate result. A drawback to this approach is that each of the three summing operations may require a separate instruction cycle. Furthermore, any of the three summing operations may produce an overflow that leads to an improperly rounded result.

In calculation intensive applications such as MPEG motion processing, it is highly desirable to calculate the average of four integers rounded towards zero in a rapid and efficient manner.

SUMMARY OF THE INVENTION

A method or apparatus in accordance with the present invention advantageously provides in one instruction cycle the average of four signed or unsigned integer numbers. The average is rounded towards zero as prescribed in the MPEG standard. Moreover, the intermediate results do not produce overflow errors, thereby preserving arithmetic accuracy.

These and other advantages are realized in the present invention, in which one embodiment is a method of operating a circuit to obtain an average of four operands, including signed and unsigned integer numbers, such that the average is an integer rounded towards zero. In this embodiment, two bits are appended to a left side of each operand to provide extended operands. For each operand, the two appended bits are zero's when the operand is unsigned, zero's when the operand is a signed positive number, and one's when the operand is a signed negative number. Thereafter, the extended operands are summed to provide an intermediate result, and the two lowest significant bits of the intermediate result are removed to provide a shortened intermediate result. The shortened intermediate result is incremented to provide the average when the operands are signed numbers and the intermediate result has a negative value and any of the removed bits is a one; otherwise the shortened intermediate result provides the average.

In another embodiment, the present invention is an apparatus comprising an append circuit, an adder circuit, a control circuit, and a multiplexer in combination. The adder circuit includes adder logic, a sum adder and a sum-plus-one adder. Preferably, the adder logic includes a plurality of carry-save adders, and the sum adder and sum-plus-one adder are each n-bit carry lookahead adders. The append circuit appends two left-side bits to each of the four n-bit operands to provide four n+2 bit extended operands. The extended operands are coupled to the adder logic. The adder logic provides the two least significant bits of the sum of the extended operands, along with n partial sum bits and n partial carry bits to the sum adder and the sum-plus-one adder. The sum adder provides a sum output representing the n most significant bits of the n+2 bit sum of the extended operands, and the sum-plus-one adder provides a sum-plus-one output representing the sum output incremented by one.

The multiplexer has one input coupled to the sum output and another input coupled to the sum-plus-one output, and has a select input coupled to a control output of the control circuit. The control circuit instructs the multiplexer to select one of the sum and sum-plus-one outputs as the n-bit average, rounded towards zero, based on inspection of the two least significant bits (provided by the adder logic) and the most significant bit (provided by the sum output) of the sum of the extended operands, and a mode signal that indicates whether the operands are signed or unsigned values.

BRIEF DESCRIPTION OF THE DRAWINGS

In the drawings, in which like reference characters indicate like parts.

DETAILED DESCRIPTION OF THE PREFERRED EMBODIMENTS

The average of four signed or unsigned integer operands rounded towards zero as prescribed in the MPEG standard is calculated in one instruction cycle by appending two bits to the left of each operand to provide extended operands, summing the extended operands to provide an intermediate result, removing the second lowest significant bit ($S_1$) and the lowest significant bit ($S_0$) from the intermediate result to provide a shortened intermediate result, and incrementing the shortened intermediate result as appropriate. For unsigned operands, the shortened intermediate result provides the average. For signed operands, rounding is based on inspection of the most significant bit ($S_{MSB}$) of the intermediate result, $S_1$, and $S_0$. For a positive result ($S_{MSB}=0$), the shortened intermediate result provides the average. For a negative result ($S_{MSB}=1$), increment the shortened intermediate result to provide the average if either $S_1$ or $S_0$ is a one, otherwise the shortened intermediate result provides the average.

As used herein, signed numbers are represented in 2's complement form in which positive numbers include zero. Positive and negative numbers indicate that the numbers are signed. Furthermore, incrementing refers to increasing by one.

Figure 2:
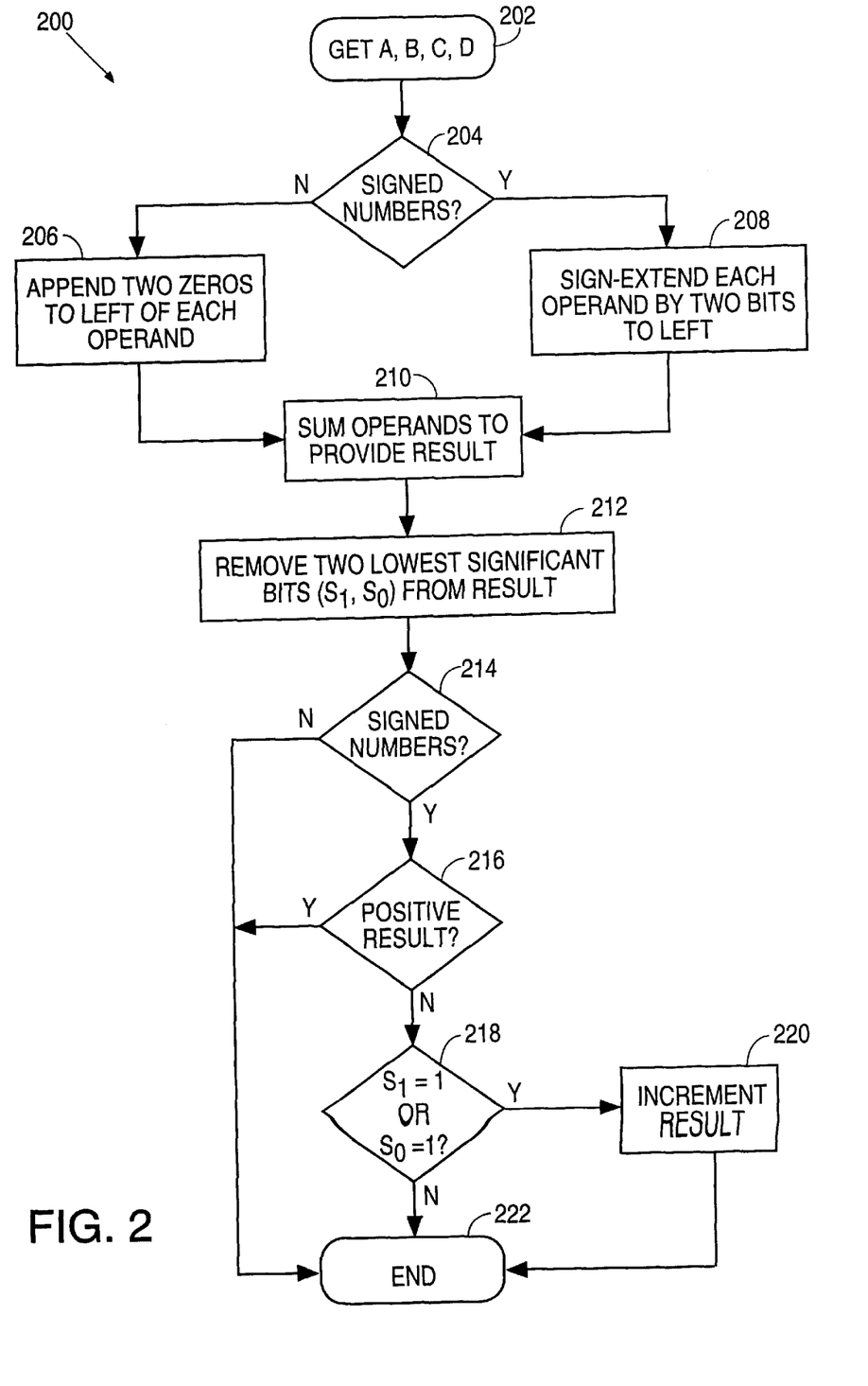
FIG. 2 is a flow chart of an algorithm in accordance with the present invention.

FIG. 2 is a flow chart of algorithm 200 in accordance with the invention. At step 202, n-bit binary operands A, B, C and D are obtained. Decision step 204 determines whether the operands are signed or unsigned numbers. If the operands are unsigned numbers, at step 206 two zero's are appended to the left of each operand, thereby providing n+2 bit extended operands. If the operands are signed operands, decision step 204 branches to step 208 where each operand is sign-extended to the left by two bits to obtain n+2 bit extended operands. Thus for each signed operand, if the MSB is a zero then two zero's are appended to the left side, whereas if the MSB is a one then two one's are appended to the left side. Steps 206 and 208 each proceed to step 210. At step 210, the extended operands are summed to provide an n+2 bit result (the intermediate result). At step 212, the two lowest significant bits $S_1$ and $S_0$ are removed (truncated) from the result to obtain an n-bit result (the shortened intermediate result). Decision step 214 determines whether the operands are signed or unsigned numbers, and reaches the same conclusion as decision step 204. If decision step 214 finds unsigned operands, then the algorithm proceeds directly to step 222 and ends. If decision step 214 finds signed operands then decision step 216 tests whether the result is positive or negative. If the result is positive, the algorithm proceeds directly to step 222 and ends. If the result is negative, decision step 218 determines if either $S_1$ or $S_0$ is a one. If so, at step 220 the result is incremented and the algorithm ends at step 222, otherwise the algorithm proceeds directly to step 222 and ends.

Variations to algorithm 200 are apparent. For instance, detecting $S_1$ and $S_0$ as zero's can lead to skipping the increment step. The operands can be summed in any order to obtain the intermediate result. Decision step 214 can be eliminated by having separate steps for signed and unsigned operands after decision step 204. Furthermore, a sum and sum-plus-one output can provide the shortened intermediate result in both non-incremented and incremented versions, with the appropriate output selected.

Consider the case of unsigned numbers in more detail. For unsigned numbers, rounding a quarter way value, a halfway value or three-quarter way value towards zero always means rounding down. If we inspect the two removed least significant bits, the possibilities are 00, 01, 10 and 11. The removed second lowest significant bit has a weight of $0.1_2$, or $0.5_{10}$, whereas the removed lowest significant bit has a weight of $0.01_2$, or $0.25_{10}$. Therefore, for 00 the result is correct, for 01 the quarter way value is insufficient for rounding, for 10 the halfway value is insufficient for rounding, and for 11 the three-quarter way value is insufficient for rounding. It should be noted that any carry-out bits from the two lowest significant bit positions are already accounted for when the intermediate result is calculated. In summary, for unsigned operands the shortened intermediate result provides the average and no incrementing occurs.

For signed operands, if the intermediate result is positive, the analysis follows the rules for rounding unsigned numbers. This is applicable not only to averaging four positive operands, but also to averaging positive and negative operands provided the sum is a positive result.

Additionally for signed numbers, if the sum of the operands is negative, a different rounding rule is applied. Observe that the value of an n-bit signed (2's complement) number A is given by the expression $$-A_{n-1} \times 2^{n-1} + \sum_{i=0}^{n-2} A_{n-2-i} \times 2^{n-2-i} \qquad (3)$$

where the bits are enumerated from 0 to n−1 for any value of integer n. For example, for n=4, $0111=(-2^{4-1} \times 0)+(2^{4-2} \times 1)+(2^{4-3} \times 1)+(2^{4-4} \times 1)=0+4+2+1=7$ \qquad (4)

$1111=(-2^{4-1} \times 1)+(2^{4-2} \times 1)+(2^{4-3} \times 1)+(2^{4-4} \times 1)=-8+4+2+1=-1$ \qquad (5)

$1000=(-2^{4-1} \times 1)+(2^{4-2} \times 0)+(2^{4-3} \times 0)+(2^{4-4} \times 0)=-8+0+0+0=-8$ \qquad (6)

Likewise, for n=5 with two bits to the right of the binary point, $$110.00=(-2^{3-1}\times1)+(2^{3-2}\times1)+(2^{3-3}\times0)+(2^{3-4}\times0)+(2^{3-5}\times0)=-4+2+0+0+0=-2 \quad (7)$$

$$110.01=(-2^{3-1}\times1)+(2^{3-2}\times1)+(2^{3-3}\times0)+(2^{3-4}\times0)+(2^{3-5}\times1)=-4+2+0+0+0.25=-1.75 \quad (8)$$

$$110.10=(-2^{3-1}\times1)+(2^{3-2}\times1)+(2^{3-3}\times0)+(2^{3-4}\times1)+(2^{3-5}\times0)=-4+2+0+0.5+0=-1.50 \quad (9)$$

$$110.11=(-2^{3-1}\times1)+(2^{3-2}\times1)+(2^{3-3}\times0)+(2^{3-4}\times1)+(2^{3-5}\times1)=-4+2+0+0.5+0.25=-1.25 \quad (10)$$

Hence, the MSB of a signed two's complement number, which is the sign bit, has a value or weight of $-2^{n-1}$ while the other bits all have a positive value or weight. The available operation is an increment by one, which adds a positive value to the LSB of the shortened intermediate result whether the shortened intermediate result is positive or negative.

Prior to the incrementing decision, a negative result is either the correct result or too large by one (e.g., −5 should be −4). Where the result is negative and the removed bits are 00, the result is already correct and no incrementing occurs. Where the result is negative and the removed bits are 01, 10 or 11, incrementing by one rounds down (or offsets) a pre-existing round away from zero, thereby providing the correct result. Various examples of signed operands applied to algorithm 200 where the sum of the extended operands is a negative result are listed below in Table 1.

TABLE 1

AVERAGE OF FOUR SIGNED NUMBERS ROUNDED TOWARDS ZERO -- NEGATIVE INTERMEDIATE RESULT

| Operands (Decimal) | Operands (Binary) | Append Left-Side Bits to Operands and Add Operands | Shortened Intermediate Result and Removed bits | Sign Bit | Increment? | Result |
|---|---|---|---|---|---|---|
| −7 | 1001 | 111001 | 1010 10 | 1 | Yes | 1010 |
| −6 | 1010 | 111010 | | | | + 0001 (offset round) |
| −5 | 1011 | 111011 | | | | 1011 (decimal −5) |
| −4 | 1100 | + 111100 | | | | |
| (−5.5 avg) | | 101010 | | | | |
| 6 | 0110 | 000110 | 1110 00 | 1 | No | 1110 |
| −6 | 1010 | 111010 | | | | + 0000 (no round) |
| −5 | 1011 | 111011 | | | | 1110 (decimal −2) |
| −3 | 1101 | + 111101 | | | | |
| (−2.0 avg) | | 111000 | | | | |
| 5 | 0101 | 000101 | 1101 11 | 1 | Yes | 1101 |
| −6 | 1010 | 111010 | | | | + 0001 (offset round) |
| −5 | 1011 | 111011 | | | | 1110 (decimal −2) |
| −3 | 1101 | + 111101 | | | | |
| (−2.25 avg) | | 110111 | | | | |
| 4 | 0100 | 000100 | 1101 10 | 1 | Yes | 1101 |
| −6 | 1010 | 111010 | | | | + 0001 (offset round) |
| −5 | 1011 | 111011 | | | | 1110 (decimal −2) |
| −3 | 1101 | + 111101 | | | | |
| (−2.5 avg) | | 110110 | | | | |
| 3 | 0011 | 000011 | 1101 01 | 1 | Yes | 1101 |
| −6 | 1010 | 111010 | | | | + 0001 (offset round) |
| −5 | 1011 | 111011 | | | | 1110 (decimal −2) |
| −3 | 1101 | + 111101 | | | | |
| (−2.75 avg) | | 110101 | | | | |
| 2 | 0010 | 000010 | 1111 10 | 1 | Yes | 1111 |
| −5 | 1011 | 111011 | | | | + 0001 (offset round) |
| −2 | 1110 | 111110 | | | | 0000 (decimal 0) |
| 3 | 0011 | + 000011 | | | | |
| (−0.5 avg) | | 111110 | | | | |
| −8 | 1000 | 111000 | 1000 00 | 1 | No | 1000 |
| −8 | 1000 | 111000 | | | | + 0000 (no round) |
| −8 | 1000 | 111000 | | | | 1000 (decimal −8) |
| −8 | 1000 | + 111000 | | | | |
| (−8 avg) | | 100000 | | | | |

In the case of unsigned operands the final result (average) is an unsigned number, whereas for signed operands the final result is also a signed number.

When the four operands are n-bit numbers, summing the operands to obtain an n+2 bit intermediate result does not cause overflow. The n+2 bit extended operands are mathematically equivalent to the n-bit operands. Therefore, any overflow generated by summing the n+2 bit extended operands to obtain the n+2 bit intermediate result can be ignored.

When the n-bit shortened intermediate result is an unsigned number (when the operands are unsigned numbers) or a positive number (when the MSB=0 and the operands are signed numbers), incrementing does not occur and therefore overflow does not occur. Likewise, when the n-bit shortened intermediate result is a negative number (when the MSB=1 and the operands are signed numbers), incrementing the shortened intermediate result decreases its magnitude and therefore does not cause overflow.

Figure 3:
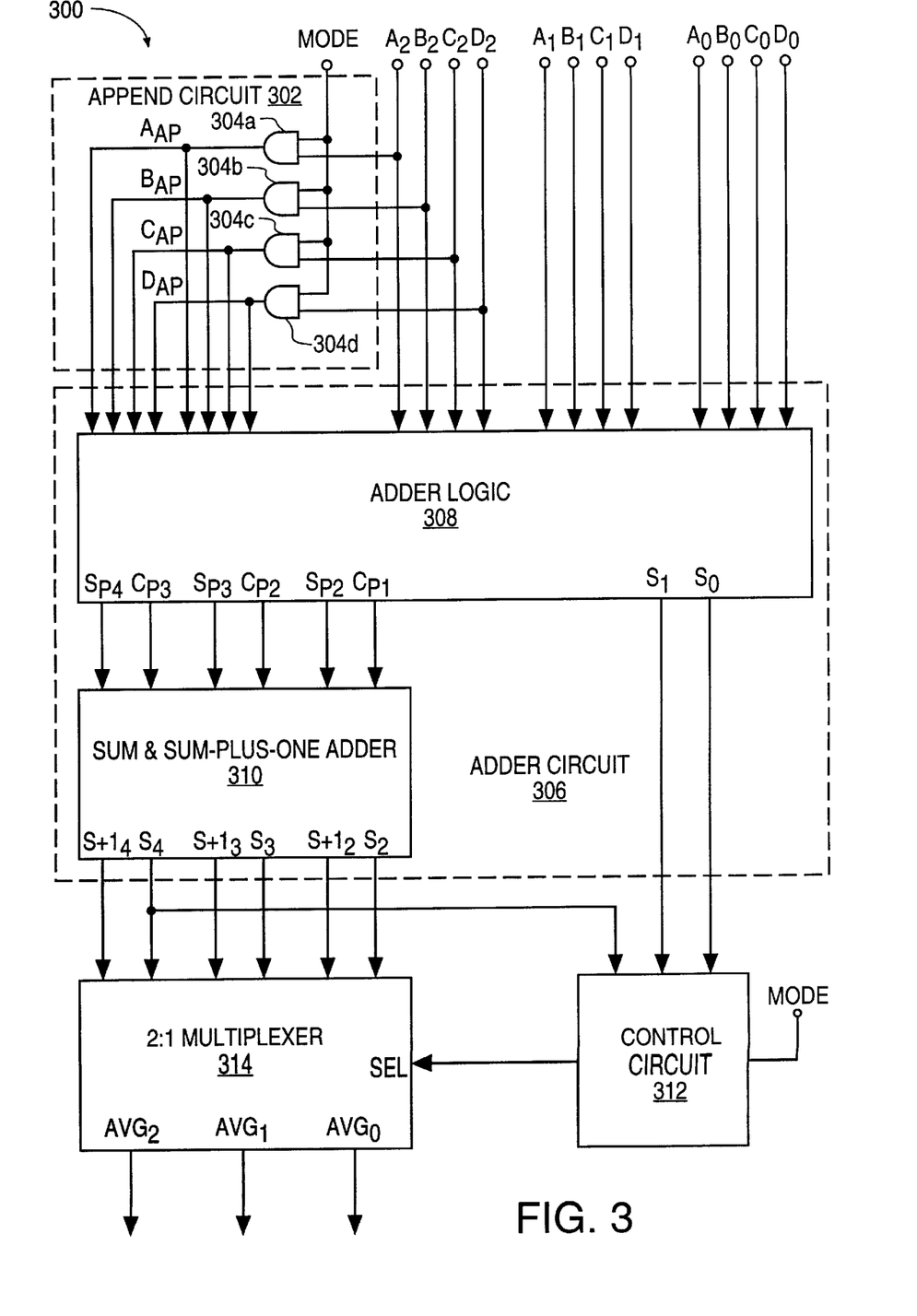
FIG. 3 is a block diagram of a logic circuit in accordance with the present invention.

FIG. 3 is a block diagram of logic circuit 300 for averaging four signed or unsigned 3-bit binary operands A, B, C and D in the manner described above. Logic circuit 300 includes append circuit 302, adder circuit 306, control circuit 312 and multiplexer 314. Append circuit 302 includes AND gates 304a, 304b, 304c and 304d for providing appended bits $A_{AP}$, $B_{AP}$, $C_{AP}$ and $D_{AP}$ for operands A, B, C and D, respectively. Operands A, B, C, and D have their respective MSBs $A_2$, $B_2$, $C_2$ and $D_2$ applied to an input of AND gates 304a, 304b, 304c and 304d, respectively. Each of the AND gates also receives a MODE signal at an input. The MODE signal is a logical 1 for signed numbers, in which case AND gates 302a, 302b, 302c and 302d pass the respective sign bits $A_2$, $B_2$, $C_2$ and $D_2$ as the appended bits $A_{AP}$, $B_{AP}$, $C_{AP}$ and $D_{AP}$, respectively, to stage 3 and stage 4 of adder circuit 306. The MODE signal is a logical 0 for unsigned numbers, in which case AND gates 304a, 304b, 304c and 304d block bits $A_2$, $B_2$, $C_2$ and $D_2$ and force the appended bits $A_{AP}$, $B_{AP}$, $C_{AP}$ and $D_{AP}$ to zero. Operands A, B, C and D have their respective bit positions $A_0$, $B_0$, $C_0$ and $D_0$ applied to stage 0 of adder circuit 306, respective bit positions $A_1$, $B_1$, $C_1$ and $D_1$ applied to stage 1 of adder circuit 306, and respective bit positions $A_2$, $B_2$, $C_2$ and $D_2$ applied to stage 2 of adder circuit 306.

Adder circuit 306 includes adder logic 308 and a 3-bit sum and sum-plus-one adder 310. Adder logic 308 receives the 5-bit extended operands, and generates sum bits $S_1$ and $S_0$ representing the second lowest significant bit, and the lowest significant bit, respectively, of the sum of the extended operands. Adder logic 308 also generates three partial sum bits $S_{P4}$, $S_{P3}$, and $S_{P2}$, and three partial carry bits $C_{P3}$, $C_{P2}$ and $C_{P1}$. The partial sum bits and partial carry bits are based on a partial sum of the extended operands, and are used for calculating the three most significant bits $S_4$, $S_3$ and $S_2$ of the sum of the extended operands. Bits $S_{P2}$ and $C_{P1}$ are applied to stage 0 of adder 310, bits $S_{P3}$ and $C_{P2}$ are applied to stage 1 of adder 310, and bits $S_{P4}$ and $C_{P3}$ are applied to stage 2 of adder 310. At the sum output of adder 310, at stage 0 bit $S_2$ is determined by adding bits $S_{P2}$ and $C_{P1}$, bit $S_3$ is determined by adding bits $S_{P3}$, $C_{P2}$ and any carry-out bit generated by stage 0, and at stage 2 bit $S_4$ is determined by adding bits $S_{P4}$, $C_{P3}$ and any carry-out bit generated by stage 1. Adder 310 also generates a sum-plus-one output $S+1_4$, $S+1_3$, and $S+1_2$ which corresponds to the sun output $S_4$, $S_3$ and $S_2$ incremented by one at bit position $S_2$. Thus, the sum output corresponds to the shortened intermediate result, the sum-plus-one output corresponds to the incremented shortened intermediate result, and bits $S_1$ and $S_0$ correspond to the removed bits.

Other techniques for appending the two bits to the left side of the operands, and for removing the second lowest and lowest significant bits from the intermediate result are known in the art. For instance, the two bits can be appended by loading n-bit operands into the n most significant bit positions of n+2 bit registers, logically right-shifting unsigned operands two bit positions to the right, and arithmetically right-shifting signed operands two bit positions to the right. Likewise, an n+2 bit intermediate result can be loaded into an n+2 bit register and right-shifted two bit positions so that the two least significant bits are shifted-out, with a logical right shift used for an unsigned intermediate result and an arithmetic right-shift used of a signed intermediate result. Thereafter, the shortened (shifted) intermediate result can be stored in a n-bit register.

Control circuit 312 receives the most significant bit $S_4$ and the two least significant bits $S_1$ and $S_0$ of the sum of the extended operands and the MODE signal, and generates select signal SEL at a control output. Control logic 312 implements the expression $$SEL = MODE \cdot S_4 \cdot (S_1 + S_0) \tag{11}$$

so that SEL is 1 to select the sum-plus-one output of adder 310 if $S_4 \cdot (S_1 + S_0)$ is a one for signed numbers, else SEL is 0 to select the sum output of adder 310.

Multiplexer 314 receives the select signal at a select input, the sum output at a first input, and the sum-plus-one output at a second input. The select signal causes multiplexer 314 to select either the sum output or the sum-plus-one output of adder 310 as the output of logic circuit 300.

Figure 4A:
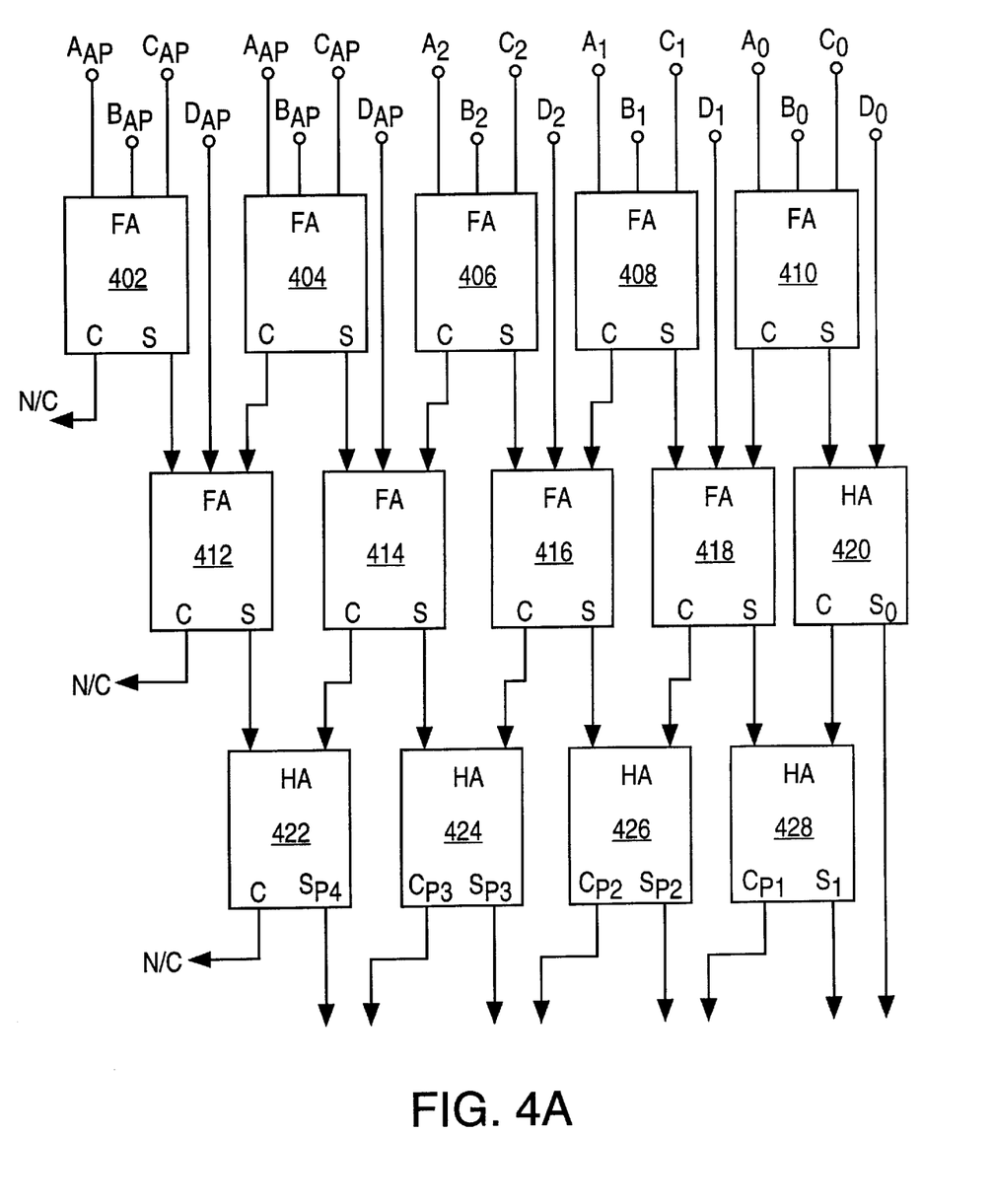
FIG. 4A is a block diagram of adder logic suitable for use in the circuit of FIG. 3.

FIG. 4A shows an implementation of adder logic 308 using carry-save adders. The implementation includes full adders 402, 404, 406, 408, 410, 412, 414, 416 and 418, and half adders 420, 422, 424, 426 and 428. Full adder 410 adds $A_0$, $B_0$ and $C_0$, and half-adder 420 determines $S_0$ by adding $D_0$ to the sum bit of full adder 410. Likewise, full adder 408 adds $A_1$, $B_1$ and $C_1$, and full adder 418 adds bit $D_1$, the sum bit of full adder 408, and the carry-out bit of full adder 410. Half adder 428 determines $S_1$ and partial carry bit $C_{P1}$ by adding the sum bit of full adder 418 to the carry-out bit of half adder 420. In a related manner, half adder 426 determines partial sum bit $S_{P2}$ and partial carry bit $C_{P2}$, half adder 424 determines partial sum bit $S_{P3}$ and partial carry bit $C_{P3}$, and sum adder 422 determines partial sum bit $S_{P4}$. It should be noted that full adders 402 and 412 and half adder 422 have no connection (N/C) to their respective carry-out bits.

Figure 4B:
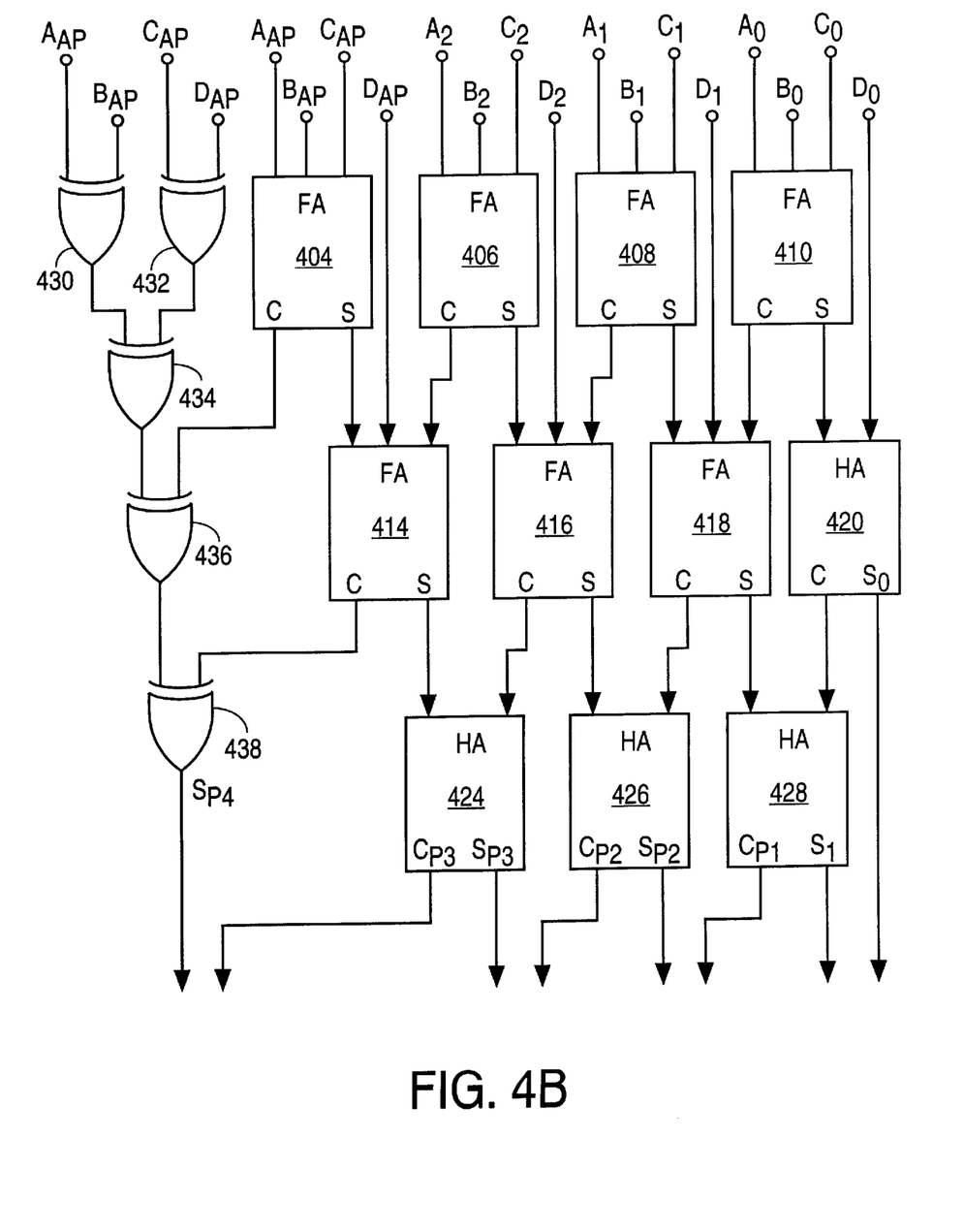
FIG. 4B is a block diagram of alternative adder logic suitable for use in the circuit of FIG. 3.

FIG. 4B shows another implementation of adder logic 308 using carry-save adders and two-input exclusive-or gates. FIG. 4B is similar to FIG. 4A, except that exclusive-or gates 430, 432, 434, 436 and 438 replace full adders 402 and 412 and half adder 422. For instance, exclusive-or gates 430, 432 and 434 generate the sum of the leftmost append bits $A_{AP}$, $B_{AP}$, $C_{AP}$ and $D_{AP}$, and exclusive-or gate 438 generates partial sum bit $S_{P4}$. Since the exclusive-or gates need not generate extraneous carry-out bits, they provide a more efficient implementation than adders 402, 412 and 422.

Figure 5:
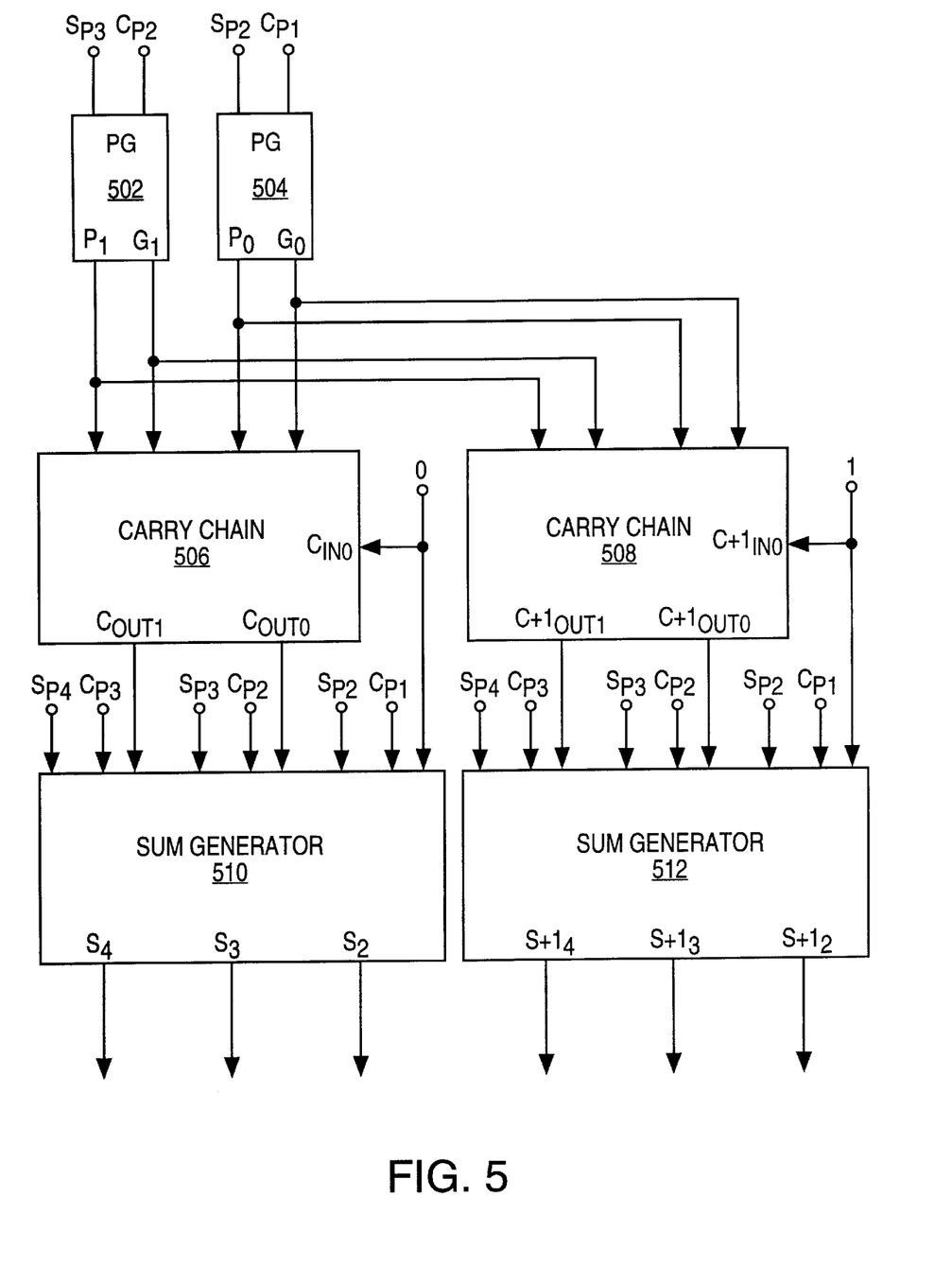
FIG. 5 is a circuit diagram of a sum and sum-plus-one adder suitable for use in the circuit of FIG. 3.

FIG. 5 shows an implementation for adder 310. In this implementation, the sum and sum-plus-one outputs are provided by carry lookahead adders. The carry lookahead adders perform fast addition within the basic step time of an instruction cycle. Propagate-generate (PG) sections 502 and 504 provide propagate and generate signals $P_1$ and $G_1$, and $P_0$ and $G_0$, for $S_{P3}$ and $C_{P2}$, and $S_{P2}$ and $C_{P1}$, respectively, representing the $2^3$ and $2^2$ bit positions of the partial sum of operands A, B, C and D. The propagate and generate signals are furnished to respective stages of carry chains 506 and 508. Carry chain 506 receives a "0" as its least significant carry-in bit $C_{IN0}$, and generates carry-out bits $C_{OUT}$ and $C_{OUT0}$ corresponding to the sum of $S_{P3}$ and $C_{P2}$, and $S_{P2}$ and $C_{P1}$ and a zero, respectively. Carry chain 508 receives a "1" as its least significant carry-in bit $C+1_{IN0}$, and generates carry-out bits $C+1_{OUT1}$ and $C+1_{OUT0}$ corresponding to the sum of $S_{P3}$ and $C_{P2}$, and $S_{P2}$ and $C_{P1}$ and a one, respectively. Carry-out bits $C_{OUT1}$ and $C_{OUT0}$ provide carry-in bits for stage 2 and stage 1, respectively, of sum generator 510, whereas carry-out bits $C+1_{OUT1}$ and $C+1_{OUT0}$ provide carry-in bits for stage 2 and stage 1, respectively, of sum generator 512.

Sum generator 510 sums $S_{P4}$, $C_{P3}$ and $C_{OUT1}$ at stage 2 to provide $S_4$, sums $S_{P3}$, $C_{P2}$ and $C_{OUT0}$ at stage 1 to provide $S_3$, and sums $S_{P2}$, $C_{P1}$ and a "0" at stage 0 to provide $S_2$. Sum generator 512 sums $S_{P4}$, $C_{P3}$ and $C+1_{OUT1}$ at stage 2 to provide $S+1_4$, sums $S_{P3}$, $C_{P2}$ and $C+1_{OUT0}$ at stage 1 to provide $S+1_3$, and sums $S_{P2}$, $C_{P1}$ and a "1" at stage 0 to provide $S+1_2$. Thus, sum generator 510 provides the sum output, and sum generator 512 provides the sum-plus-one output. As should be clear, the sum generators need not generate carry-out bits since these are already provided by the carry chains. Each stage of the sum generators may include, for instance, first and second two-input exclusive-or gates (not shown), with the inputs of the first exclusive-or gate and the second input of the second exclusive-or gate receiving the numbers to be summed, the output of the first exclusive-or gate coupled to the first input of the second exclusive-or gate, and the output of the second exclusive-or gate providing the result. Suitable PG sections, carry chains and sum generators are well-known in the art. Furthermore, any circuit such as a carry select adder that implements a sum and a sum-plus-one of two binary numbers may be used for adder 310.

Figure 6:
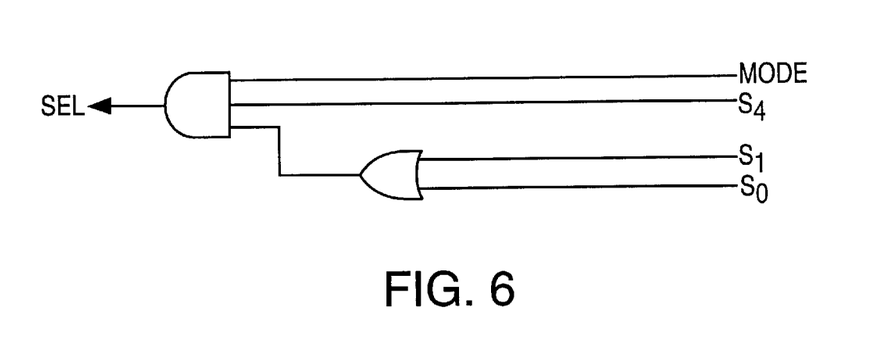
FIG. 6 is a circuit diagram a control circuit suitable for use in the circuit of FIG. 3.
Figure 7:
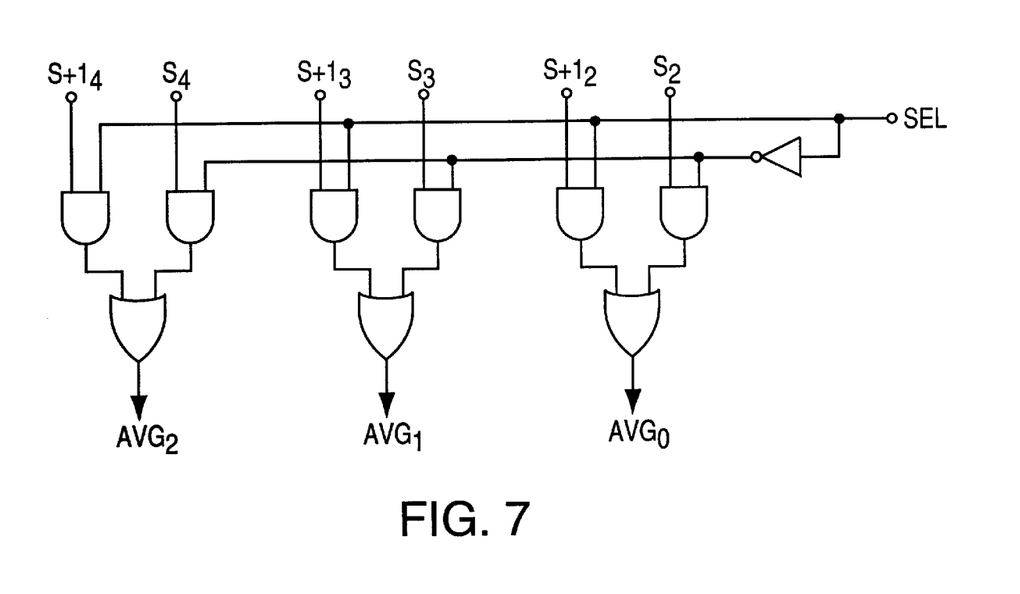
FIG. 7 is a circuit diagram of a multiplexer suitable for use in the circuit of FIG. 3.

FIG. 6 shows an implementation for control circuit 312 in accordance with expression (11) above, and FIG. 7 shows an implementation for multiplexer 314. Numerous 2:1 multiplexer designs and related data selector circuits are well-known in the art.

The description of the invention set forth herein is illustrative, and is not intended to limit the scope of the invention as set forth in the following claims. For example, append circuit 302, adder circuit 306, control circuit 312 and multiplexer 314 may be implemented in any suitable circuitry. The operands can be any bit length of at least three. A general purpose computer or processor with suitable circuitry can execute the invention in a single instruction cycle (as is preferred) or multiple instruction cycles. The invention is well-suited for many applications besides MPEG motion processing. Variations and modifications of the embodiments disclosed herein may be made based on the description set forth herein, without departing from the scope and spirit of the invention as set forth in the following claims.

What is claimed is:

1. A method of operating a circuit to obtain an average of four signed operands, such that the average is an integer rounded towards zero in a single instruction cycle, comprising:

appending two bits to a left end of each of the operands to provide extended operands, wherein for each operand the two appended bits are zero's when the operand is a positive number, and one's when the operand is a negative number, summing the extended operands to provide an intermediate result;

removing a lowest significant bit and a second lowest significant bit from the intermediate result to provide a shortened intermediate result;

incrementing the shortened intermediate result to provide the average when the intermediate result has a negative value and either of the removed bits is a one; and providing the shortened intermediate result as the average (i) when the intermediate result has a positive value, and (ii) when the intermediate result has a negative value and both of the removed bits are zero's.

2. The method of claim 1, wherein the average is provided by a multiplexer in a processor.

3. A method of operating a circuit to obtain an average of four operands, including signed and unsigned integers, such that the average is an integer rounded towards zero in a single instruction cycle, comprising:

appending two bits to a left end of each of the operands to provide extended operands, wherein for each operand the two appended bits are zero's when the operand is unsigned, zero's when the operand is a signed positive number, and one's when the operand is a signed negative number;

summing the extended operands to provide an intermediate result;

removing a lowest significant bit and a second lowest significant bit from the intermediate result to provide a shortened intermediate result;

incrementing the shortened intermediate result to provide the average when the operands are signed numbers and the intermediate result has a negative value and either of the removed bits is a one; and providing the shortened intermediate result as the average (i) when the operands are unsigned numbers, (ii) when the operands are signed numbers and the intermediate result has a positive value, and (iii) when the operands are signed numbers and the intermediate result has a negative value and both of the removed bits are zero's.

4. The method of claim 3, wherein the summing is provided by an adder that includes propagate-generate sections, a carry chain and a sum generator.

5. The method of claim 3, wherein the average is provided by a multiplexer in a processor.

6. A method of operating a circuit to obtain an n-bit average of four n-bit operands, including signed and unsigned integers, such that the average is an integer rounded towards zero in a single instruction cycle, comprising:

appending two bits to a left end of each of the four n-bit operands to provide four n+2 bit extended operands, wherein for each operand the two appended bits are zero's when the operand is unsigned, zero's when the operand is a signed positive number, and one's when the operand is a signed negative number;

summing the four extended operands to provide an n+2 bit intermediate result;

removing a lowest significant bit and a second lowest significant bit from the intermediate result to provide an n-bit shortened intermediate result;

incrementing the shortened intermediate result to provide the n-bit average when the four operands are signed numbers and the intermediate result has a negative value and either of the removed bits is a one; and providing the shortened intermediate result as the n-bit average (i) when the four operands are unsigned numbers, (ii) when the four operands are signed numbers and the intermediate result has a positive value, and (iii) when the four operands are signed numbers and the intermediate result has a negative value and both of the removed bits are zero's.

7. The method of claim 6, wherein the summing is performed by an n+2 bit adder circuit.

8. The method of claim 7, wherein the adder circuit includes an n-bit carry lookahead sum adder and an n-bit carry lookahead sum-plus-one adder, incrementing the shortened intermediate result to provide the average includes selecting an output of the sum-plus-one adder, and providing the shortened intermediate result as the average includes selecting an output of the sum adder.

9. The method of claim 8, wherein the average is provided by a multiplexer in a processor.

10. An apparatus for obtaining an average of four n-bit operands such that the average is an integer rounded towards zero, comprising:
   an append circuit for appending two bits to a left side of each of the operands to provide four n+2 bit extended operands, wherein for each operand the two appended bits are zero's when the operand is unsigned, zero's when the operand is a signed positive number, and one's when the operand is a signed negative number;
   an adder circuit including
      adder logic having four n+2 bit operand inputs coupled respectively to the four extended operands for providing a lowest significant bit of a sum of the four extended operands, a second lowest significant bit of the sum of the four extended operands, n partial sum bits based on the four extended operands, and n partial carry bits based on the four extended operands,
      an n-bit sum adder having a first input coupled to the partial carry bits, having a second input coupled to the partial sum bits, and having a sum output for providing n most significant bits of the sum of the four extended operands, and
      a sum-plus-one adder having a first input coupled to the partial carry bits, having a second input coupled to the partial sum bits, and having a sum-plus-one output for providing the n most significant bits of the sum, incremented by one, of the four extended operands;
   a control circuit having inputs coupled to the lowest significant bit, the second lowest significant bit, a most significant bit of the sum output, and to a mode signal that indicates whether the operands are signed or unsigned numbers, and having a control output; and
   a multiplexer having a first input coupled to the sum output and a second input coupled to the sum-plus-one output, and having a select input coupled to the control output of the control circuit;
   wherein the control output of the control circuit causes the multiplexer to select the second input thereof when the operands are signed numbers and the sum output has a negative value and either of the second lowest and the lowest significant bits is a one, and the control output of the control circuit causes the multiplexer to select the first input thereof (i) when the operands are unsigned numbers, (ii) when the operands are signed numbers and the sum output has a positive value, and (iii) when the operands are signed numbers and the sum output has a negative value and both of the second lowest and the lowest significant bits are zero's.

11. The apparatus of claim 10, wherein the sum output has a positive value when the mode signal indicates signed numbers and the most significant bit of the sum output is a zero, and the sum output has a negative value when the mode signal indicates signed numbers and the most significant bit of the sum output is a one.

12. The apparatus of claim 10, wherein the append circuit includes four AND gates, with each AND gate having a first input coupled to the mode signal and a second input coupled to a respective most significant bit of one of the operands.

13. The apparatus of claim 10, wherein the adder logic includes a plurality of carry-save adders.

14. The apparatus of claim 13, wherein the adder logic further includes a plurality of exclusive-or gates.

15. The apparatus of claim 14, wherein the adder logic consists of the carry-save adders and the exclusive-or gates.

16. The apparatus of claim 14, wherein the exclusive-or gates include first, second and third exclusive-or gates each having two inputs and one output, four inputs of the first and second exclusive-or gates are coupled respectively to one appended bit of each of the extended operands, and two outputs of the first and second exclusive-or gates are coupled to two inputs of the third exclusive-or gate.

17. The apparatus of claim 10, wherein the sum adder is an n-bit carry lookahead adder that includes first propagate-degenerate sections coupled to a first carry chain coupled to a first sum generator that provides the sum output, and the sum-plus-one adder is an n-bit carry lookahead adder that includes second propagate-generate sections coupled to a second carry chain coupled to a second sum generator that provides the sum-plus-one output.

18. The apparatus of claim 17, wherein the sum adder and the sum-plus-one adder share the first and second propagate-generate sections, the first carry chain and the first sum generator have a least significant carry-in bit set to logical 0, and the second carry chain and the second sum generator have a least significant carry-in bit set to logical 1.

19. An apparatus for obtaining an average of four n-bit operands A, B, C and D, including signed and unsigned integer numbers, such that the average is an integer rounded towards zero, comprising:
   an append circuit having an input coupled to a most significant bit of the operands and to a mode signal MODE indicative of whether the operands are signed or unsigned numbers, and having an output for appending two bits to a left side of each operand, wherein for each operand the two appended bits are zero's when MODE indicates unsigned numbers, zero's when MODE indicates signed numbers and the most significant bit of the operand is a zero, and one's when MODE indicates signed numbers and the most significant bit of the operand is a one, thereby transforming the operands into n+2 bit extended operands;
   an adder circuit including
      adder logic having four n+2 bit operand inputs coupled respectively to the four extended operands, and having an output for providing a lowest significant bit ($S_0$) of a sum of the extended operands, providing a second lowest significant bit ($S_1$) of the sum of the extended operands, and providing n partial sum bits and n partial carry bits based on partially summing the extended operands,
      an n-bit sum adder having first and second inputs coupled respectively to the partial sum bits and the partial carry bits, and having an n-bit sum output S for providing the n leftmost bits of the sum of the four extended operands, wherein the n leftmost bits include a most significant bit ($S_{MSB}$),
      an n-bit sum-plus-one adder having first and second inputs coupled respectively to the partial sum bits and the partial carry bits, and having an n-bit sum-plus-one output S+1 for incrementing by one the n leftmost bits of the sum of the four extended operands;

a control circuit having inputs coupled to $S_0$, $S_1$, $S_{MSB}$, and MODE, and having a control output; and a multiplexer having a first input coupled to the sum output S of the sum adder, having a second input coupled to the sum-plus-one output S+1 of the sum-plus-one adder, and having a select input SEL coupled to the control output;

wherein the control output is determined in accordance with the expression $$SEL = MODE \cdot S_{MSB} \cdot (S_1 + S_0).$$

20. An apparatus for obtaining an n-bit average of four n-bit operands, including signed and unsigned integer numbers, such that the average is an integer rounded towards zero, comprising:

means for recognizing whether the operands are signed or unsigned numbers;

means for transforming the operands into n+2 bit extended operands by appending two bits to a left side of each operand, wherein for each operand the two appended bits are zero's when the operand is unsigned, zero's when the operand is a signed positive number, and one's when the operand is a signed negative number;

means for summing the extended operands to provide an n+2 bit sum with a most significant bit ($S_{MSB}$);

means for removing a lowest significant bit ($S_0$) and a second lowest significant bit ($S_1$) from the n+2 bit sum to provide an n-bit sum;

means for incrementing the n-bit sum to provide the average when the operands are signed numbers and $S_{MSB}$ is a one and either of $S_1$ and $S_0$ is a one; and means for providing the n-bit sum as the average (i) when the operands are unsigned numbers, (i) when the operands are signed numbers and $S_{MSB}$ is a zero, and (iii) when the operands are signed numbers and $S_{MSB}$ is a one and both $S_1$ and $S_0$ are zero's.

21. A method of operating a circuit to obtain an average of four signed operands, such that the average is an integer rounded towards zero and the average is provided by a multiplexer, comprising:

appending two bits to a left end of each of the operands to provide extended operands, wherein for each operand the two appended bits are zero's when the operand is a positive number, and one's when the operand is a negative number;

summing the extended operands to provide an intermediate result;

removing a lowest significant bit and a second lowest significant bit from the intermediate result to provide a shortened intermediate result;

incrementing the shortened intermediate result to provide the average when the intermediate result has a negative value and either of the removed bits is a one; and providing the shortened intermediate result as the average (i) when the intermediate result has a positive value, and (ii) when the intermediate result has a negative value and both of the removed bits are zero's.

22. The method of claim 21, performed in a single instruction cycle.

23. A method of operating a circuit to obtain an average of four operands, including signed and unsigned integers, such that the average is an integer rounded towards zero and the average is provided by a multiplexer, comprising:

appending two bits to a left end of each of the operands to provide extended operands, wherein for each operand the two appended bits are zero's when the operand is unsigned, zero's when the operand is a signed positive number, and one's when the operand is a signed negative number;

summing the extended operands to provide an intermediate result;

removing a lowest significant bit and a second lowest significant bit from the intermediate result to provide an shortened intermediate result;

incrementing the shortened intermediate result to provide the average when the operands are signed numbers and the intermediate result has a negative value and either of the removed bits is a one; and providing the shortened intermediate result as the average (i) when the operands are unsigned numbers, (ii) when the operands are signed numbers and the intermediate result has a positive value, and (iii) when the operands are signed numbers and the intermediate result has a negative value and both of the removed bits are zero's.

24. The method of claim 23, performed in a single instruction cycle.

25. The method of claim 23, wherein the multiplexer is in a processor.

26. A method of operating a circuit to obtain an n-bit average of four n-bit operands, including signed and unsigned integers, such that the average is an integer rounded towards zero and the average is provided by a multiplexer, comprising:

appending two bits to a left end of each of the four n-bit operands to provide four n+2 bit extended operands, wherein for each operand the two appended bits are zero's when the operand is unsigned, zero's when the operand is a signed positive number, and one's when the operand is a signed negative number;

summing the four extended operands to provide an n+2 bit intermediate result;

removing a lowest significant bit and a second lowest significant bit from the intermediate result to provide an n-bit shortened intermediate result;

incrementing the shortened intermediate result to provide the n-bit average when the four operands are signed numbers and the intermediate result has a negative value and either of the removed bits is a one; and providing the shortened intermediate result as the n-bit average (i) when the four operands are unsigned numbers, (ii) when the four operands are signed numbers and the intermediate result has a positive value, and (iii) when the four operands are signed numbers and the intermediate result has a negative value and both of the removed bits are zero's.

27. The method of claim 26, wherein the summing is performed by an n+2 bit adder circuit.

28. The method of claim 27, wherein the adder circuit includes an n-bit carry lookahead sum adder and an n-bit carry lookahead sum-plus-one adder, incrementing the shortened intermediate result to provide the average includes selecting an output of the sum-plus-one adder, and providing the shortened intermediate result as the average includes selecting an output of the sum adder.

29. The method of claim 28, performed in a single instruction cycle.

* * * * *